Sept. 5, 1967 T. R. SMITH 3,339,578
LEVEL SENSING MEANS FOR ELECTRICALLY CONDUCTIVE MATERIALS
Original Filed May 26, 1965
3 Sheets-Sheet 1
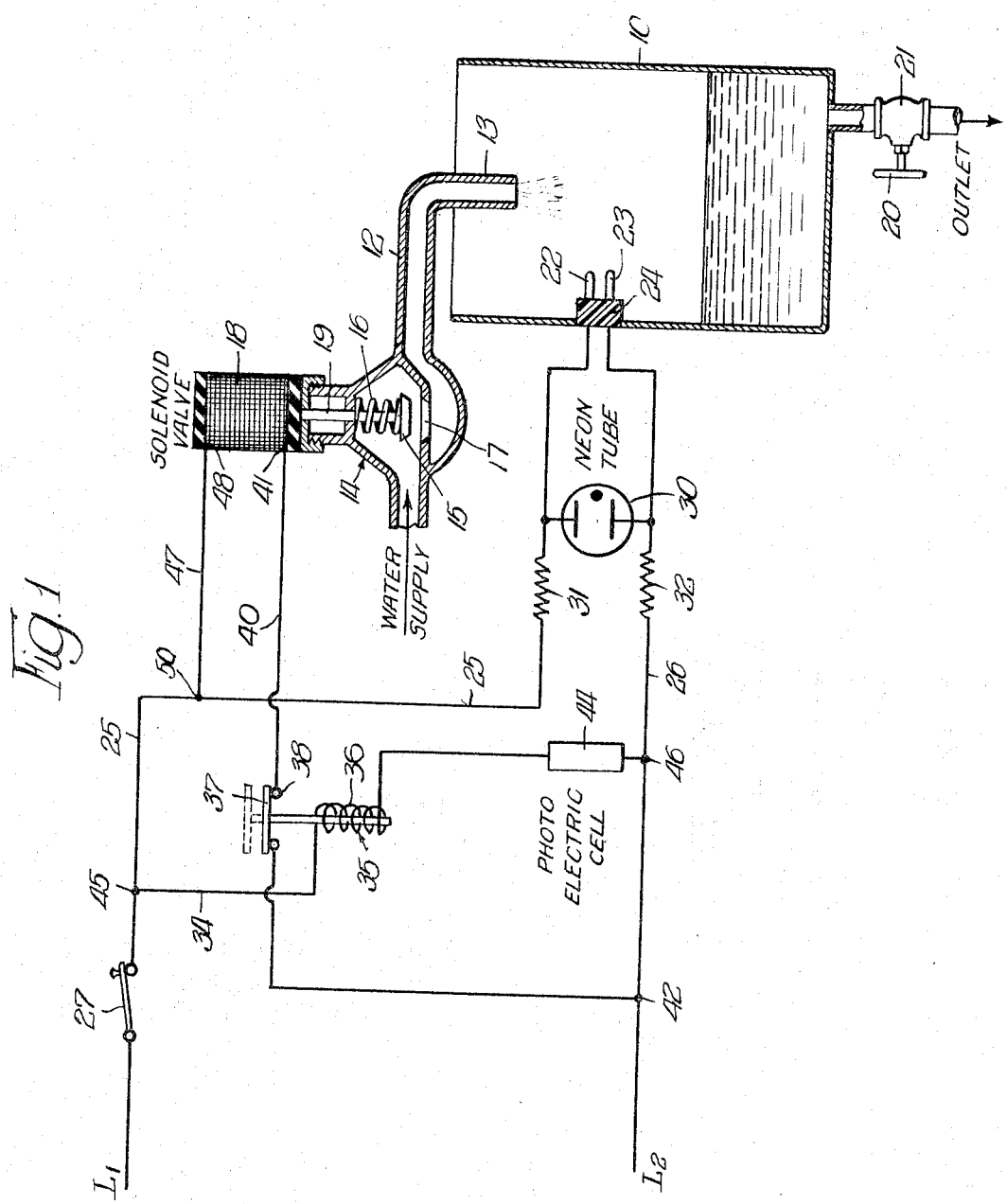
INVENTOR.
Thomas R. Smith,
BY
William G. Landwier
Agent.

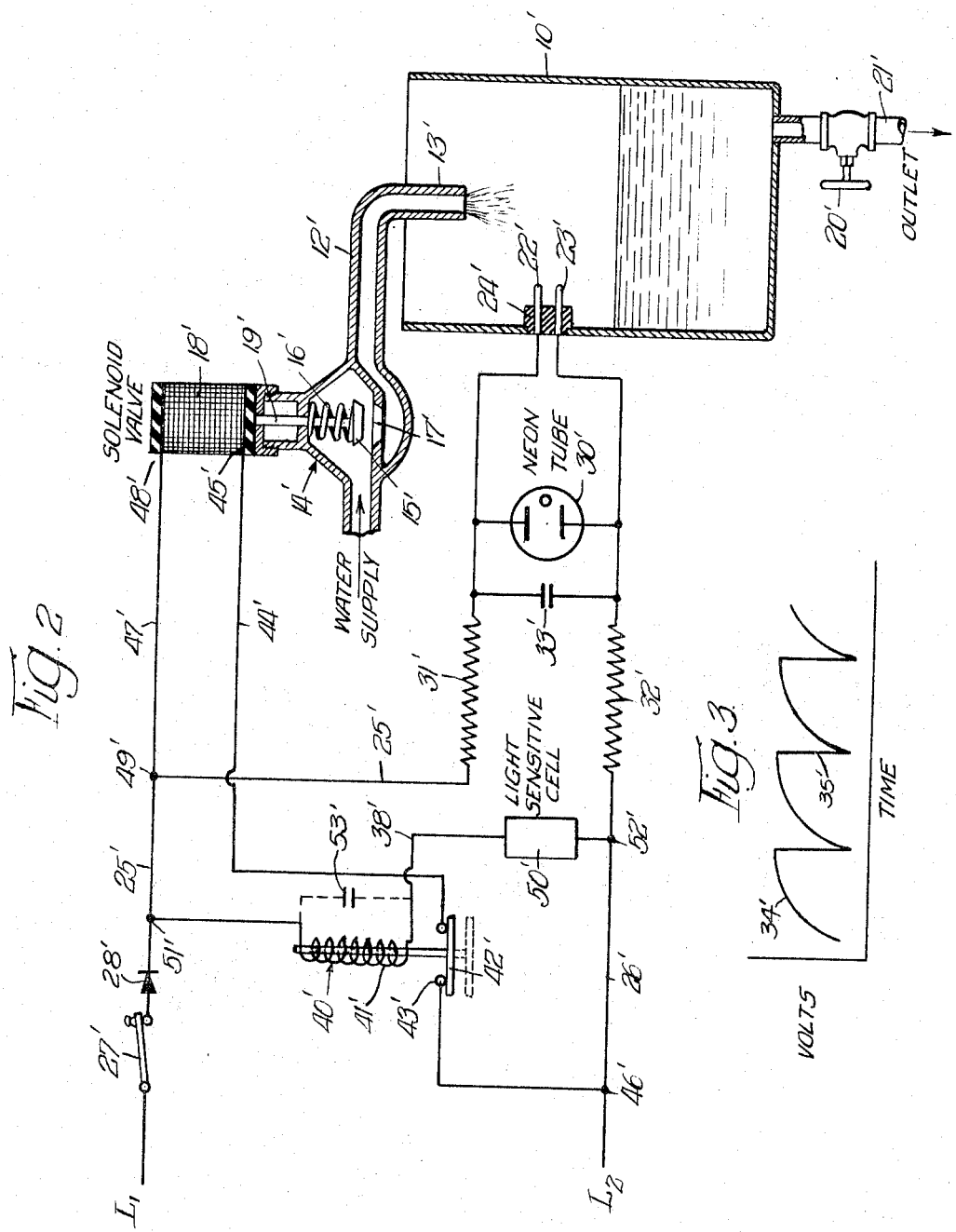

Sept. 5, 1967 T. R. SMITH 3,339,578
LEVEL SENSING MEANS FOR ELECTRICALLY CONDUCTIVE MATERIALS
Original Filed May 26, 1965 3 Sheets-Sheet 3
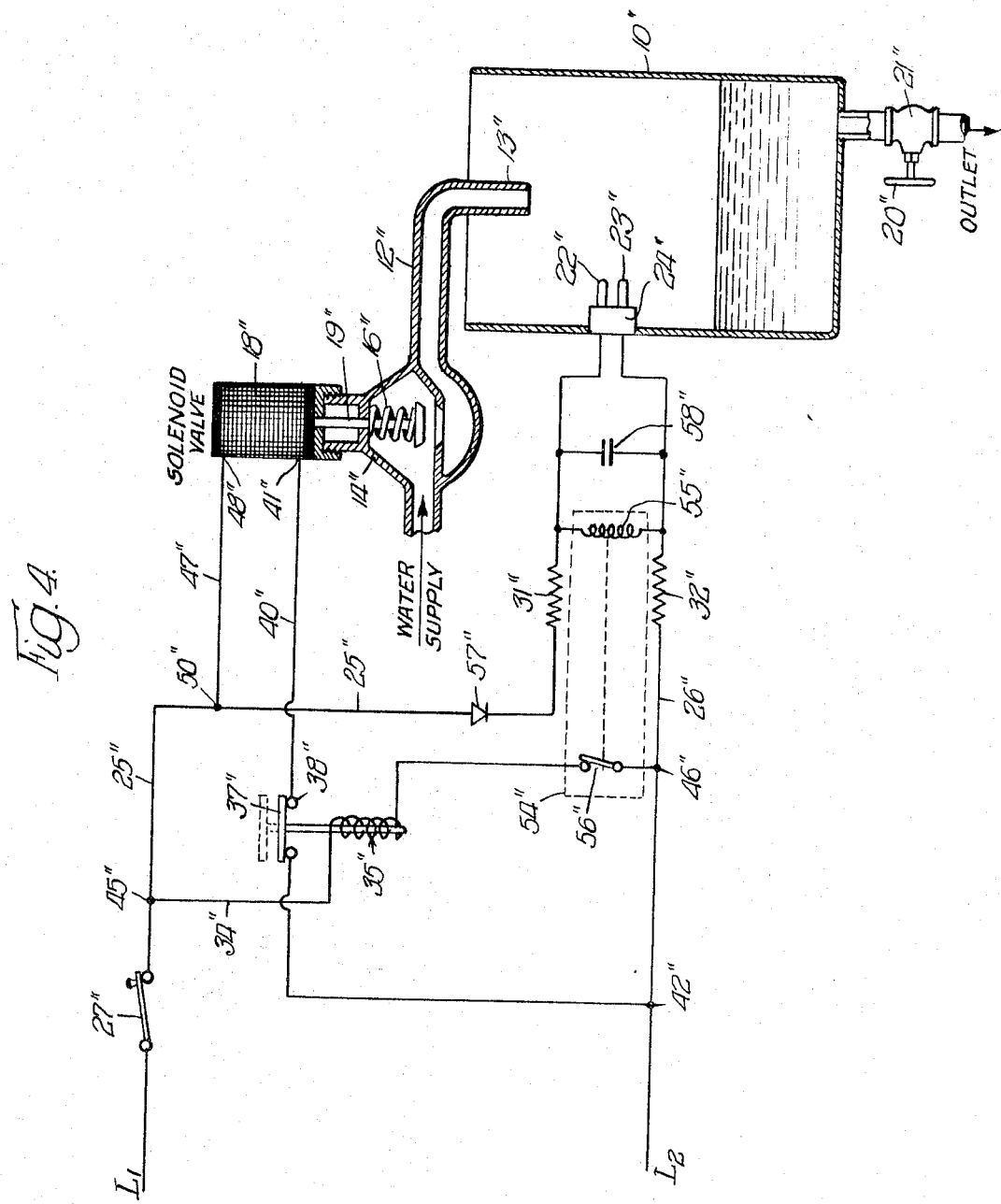
Inventor:
Thomas R. Smith,
By William G. Landwier
agent.

United States Patent Office 3,339,578
Patented Sept. 5, 1967

3,339,578
LEVEL SENSING MEANS FOR ELECTRICALLY CONDUCTIVE MATERIALS
Thomas R. Smith, Newton, Iowa, assignor to The Maytag Company, Newton, Iowa, a corporation of Delaware
Continuation of application Ser. No. 463,462, May 26, 1965. This application July 29, 1966, Ser. No. 568,975
15 Claims. (Cl. 137—392)

This case is a continuation of Ser. No. 463,462 filed May 26, 1965, now abandoned, which was a continuation-in-part of application Ser. No. 318,719, filed Oct. 24, 1963, now abandoned, of application Ser. No. 86,745 filed Feb. 2, 1961, now abandoned, of application Ser. No. 153,473 filed Nov. 20, 1961, now abandoned, the latter two of which are a continuation-in-part of application Ser. No. 22,323 filed Apr. 14, 1960, now abandoned.

The invention relates to improvements in water sensing and control apparatus and has reference more particularly to electronic circuit means such as may have utility in sensing the presence of water in a container or which may be employed for regulating the level of the water in a container.

One commercial application of the present invention concerns domestic clothes washing machines wherein, during the several washing cycles, water is supplied to a container or tub and following the particular cycle the water is discharged to a drain. The switch devices as heretofore employed in connection with the control and regulation of the water are subject to mechanical failures which are eliminated by the present invention. Also, less space is required for the control means of the invention and greater versatility in the location of the controls is possible, since the connections are all electrical.

A further object of the invention resides in the provision of improved water sensing and control means of the electronic type and which will incorporate probes or electrodes extending through an insulating plug or the like for insulating one electrode from the other. The electrodes are in circuit with an electronic tube supplied with current through high resistance elements. Accordingly, the electric circuit is perfectly safe for use in home appliances and when the electrodes are shorted by the water, the current used is negligible.

A further advantage resides in the fact that a breakage of the electronic tube or a failure of the electric power as well as a shorting of the electrodes will automatically effect a closing or an opening of an auxiliary circuit which can be used for control or for other purposes.

Another object is to provide water control means of the type described and wherein the electrodes are formed of stainless steel, platinum or other non-corrosive conductive material so as to resist corrosion, and wherein the insulating plug through which the electrodes extend is preferably formed of a plastic having non-wetting characteristics.

With these and other objects in view, the invention may consist of certain novel features of construction and operation, as will be more fully described and particularly pointed out in the specification, drawings and claims appended thereto.

FIGURE 1 of the drawings illustrates diagrammatically a water level control comprising one embodiment of the invention;

FIGURE 2 of the drawings illustrates diagrammatically a water level control comprising another embodiment of the invention;

FIGURE 3 is a diagram illustrating the charging and discharging action of the condenser in the FIGURE 2 embodiment; and FIGURE 4 of the drawings illustrates diagrammatically a water level control comprising another embodiment of the invention.

The invention is illustrated as applied to apparatus for the control or regulation of the water level in a container or tub although it will be appreciated that the concept as thus disclosed may be used to sense the presence of moisture or water or for other similar purpose, and wherein the auxiliary circuit may produce a signal instead of actually controlling a solenoid valve.

Referring to FIGURE 1 of the drawings, the container or tub 10 may comprise part of a domestic washing machine and which is alternately filled with water and then emptied as is customary with such machines during the various washing cycles. The numeral 12 indicates the water supply pipe having the downturned discharge end 13 and which directs the water flow into the container 10. The said pipe 12 is provided with the solenoid valve 14 having the valve member 15 which is yieldingly urged by the coil spring 16 into engagement with the valve seat 17 to close the valve. The solenoid 18 is operatively connected to the valve stem 19 so that upon energization of the solenoid the valve member 15 is lifted from its seat to thus open the valve. The container 10 is emptied of its water by opening the valve 20 in the outlet pipe 21 which may be manually or automatically controlled.

The electrodes 22 and 23 project into the container 10 by extending through the plastic plug 24 in which they are mounted, and with the plastic plug being mounted in a wall of the container. The said electrodes are disposed in substantially parallel relation to each other and the same are located at the desired water level. The said electrodes are preferably formed of stainless steel, platinum or other non-corrosive conductive material in order to effectively resist corrosion. Also, the plug 24 should consist of a plastic having non-wetting characteristics. A tetrafluoroethylene plastic sold under the trade name "Teflon" has been found entirely satisfactory. When such a plastic is used the surface between the electrodes will always be dry unless the electrodes are immersed in the water.

The electric circuit for the electrodes 22 and 23 includes the conductors 25 and 26 which connect with the electrodes 22 and 23, respectively. Conductor 25 provides one terminal of the power circuit, the same having connections therewith at $L_1$. The main switch 27 for controlling the power supply may be located in this conductor. The other conductor 26 has similar connection to the other terminal of the power circuit as at $L_2$. The terminals $L_1$ and $L_2$ may have connection with the conventional home outlet which supplies 115 volt, 60 cycle alternating current. The electronic tube 30 is connected across the conductors 25 and 26, immediately in advance of the electrodes. The resistances 31 and 32 are located in the conductors 25 and 26, respectively, in advance of the tube. The tube 30 is preferably of the diode type and may contain neon gas or the like, so that it glows when conductive. The resistances 31 and 32 are relatively high in ohms in order to provide a high voltage drop and therefore a low voltage across tube 30 when only a minute current is carried across the electrodes 22 and 23 and to reduce to a safe level the electric power delivered to the tubes and to the electrodes.

The conductor 34 provides an auxiliary relay circuit which is associated with the conductors 25 and 26. The auxiliary circuit provides the normally open relay designated in its entirety by numeral 35. The said relay includes the coil 36 and the contactor 37 having coaction with the contacts 38 in conductor 40 for closing and opening the circuit to the solenoid 18. Said conductor 40 is electrically connected to the solenoid at 41 and to the terminal L₂ by connection at 42 with conductor 26. The circuit to the solenoid 18 is completed by conductor 47 having connection with the solenoid at 48 and with conductor 25 at 50.

In accordance with the invention a light responsive resistor such as a photoelectric cell 44 is connected by the conductor 34 in series relation with the relay coil 36. Since the conductor 34 is joined to conductors 25 and 26 at 45 and 46, respectively, the photoelectric cell and relay coil are thus connected across the terminals $L_1$ and $L_2$. The photoelectric cell 44 is positioned in relatively close association with the neon tube 30 so as to be illuminated by the tube when the tube is passing an electric current, that is, when the tube is conducting.

In FIGURE 1 of the drawings, it will be observed that the main switch 27 is closed and that the neon tube 30 is conducting, since the level of the water in the container 10 is below the electrodes 22 and 23. With the neon tube passing current it will be understood that the photoelectric cell 44 is accordingly illuminated and as a result the relay coil 36 is energized. The contactor 37 is thus held closed against the contacts 38 and the solenoid 18 is also energized. When the solenoid is energized, the valve member 15 is held open and water is accordingly supplied to the container.

When the water reaches a level connecting electrodes 23 and 22, the said water provides a path for current thereby causing an increased voltage drop across resistors 31 and 32 so that the voltage across the neon tube 30 drops too low to maintain a glow discharge. The water across the electrodes then in effect shorts out the neon bulb and the tube does not illuminate the photoelectric cell 44. The cell has such characteristics that it presents negligible resistance to current flow when illuminated, but relatively high resistance when not illuminated. Without the illumination of the neon tube, the resistance of the cell becomes very high and the relay coil 36 becomes deenergized, and the contractor 37 is released to also deenergize the solenoid 18. Thus, the valve member 15 is caused to close by spring 16 to shut off the flow of water to the container.

Referring to FIGURE 2 of the drawings, the container 10′ may comprise part of a domestic washing machine and which is alternately filled with water and then emptied as is customary with such machines during the various washing cycles. The numeral 12′ indicates the water supply pipe having the down-turned discharge end 13′ and which directs the water flow into the container 10′. The said pipe 12′ is provided with the solenoid valve 14′ having the valve member 15′ which is yieldingly urged by the coil spring 16′ into engagement with the valve seat 17′ to close the valve. The solenoid 18′ is operatively connected to the valve stem 19′ so that upon energization of the solenoid the valve member 15′ is lifted from its seat to thus open the valve. The container 10′ is emptied of its water by opening the valve 20′ in the outlet pipe 21′ which may be manually or automatically controlled.

The electrodes 22′ and 23′ project into the container 10′ by extending through the plastic plug 24′ being mounted in a wall of the container. The said electrodes are disposed in substantially parallel relation to each other and the same are located at the described water level. The said electrodes are preferably formed of stainless steel, platinum or other non-corrosive conducting material in order to effectively resist corrosion. Also, the plug 24′ should consist of a plastic having non-wetting characteristics. A tetrafluoroethylene plastic sold under the trade name "Teflon" has been found entirely satisfactory. When such a plastic is used, the surface between the electrodes will always be dry unless the electrodes are immersed in the water.

The electric circuit for the electrodes 22′ and 23′ includes the conductors 25′ and 26′ which connect with the electrodes 22′ and 23′, respectively. Conductor 25′ provides one terminal of the power circuit, the same having connections therewith at $L_1$. The main switch 27′ for controlling the power supply may be located in this conductor as well as a selenium half-wave rectifier 28′. The other conductor 26′ has similar connections to the other terminal of the power circuit as at $L_2$. The terminals $L_1$ and $L_2$ may have connection with the conventional home outlet which supplies 115 volt, 60 cycle alternating current. The electronic tube 30′ is connected across the conductors 25′ and 26′ immediately in advance of the electrodes. The resistances 31′ and 32′ are located in the conductors 25′ and 26′, respectively, in advance of the tube 30′. The tube is preferably of the diode type and may contain neon gas or the like, so that it glows when conductive. The resistances 31′ and 32′ are relatively high in ohms in order to provide a high voltage drop and therefore a low voltage across tube 30′ when only a minute current is carried across the electrodes 22′ and 23′ and to reduce to a safe level the electric power to the tube and to the electrodes. The resistances may each have value in ohms in the neighborhood of 150,000.

The condenser 33′ is connected to conductors 25′ and 26′ across the resistances 31′ and 32′ and in parallel relation with both the neon tube 30′ and the electrodes 22′ and 23′. The condenser 33′ is positioned between the resistances and the neon tube and thus the condenser is alternately charged by the current flowing in the resistance circuit and discharged through the neon tube. The diagram in FIGURE 3 illustrates the action of the condenser with numeral 34′ showing the charging intervals and the numeral 35′ indicating the discharging action, both being plotted against time. Accordingly, the neon tube will flash with a frequency represented by the vertical lines 35′. The condenser may have a value of approximately one microfarad.

The conductor 38′ provides an auxiliary relay circuit which is associated with the conductors 25′ and 26′. The auxiliary circuit provides the normally open relay designated in its entirety by numeral 40′. The said relay includes the coil 41′ and the contactor 42′ having coaction with the contacts 43′ in conductor 44′ for closing and opening the circuit to the solenoid 18′. Said conductor 44′ is electrically connected to the solenoid at 45′ and to the terminal $L_2$ by connection at 46′ with conductor 26′. The circuit to the solenoid 18′ is completed by conductor 47′ having connection with the solenoid 18′ at 48′ and with conductor 25′ at 49′.

In accordance with the invention a light responsive resistor such as a photoelectric cell 50′ is connected by the conductor 38′ in series relation with the relay coil 41′. Since the conductor 38′ is joined to conductors 25′ and 26′ at 51′ and 52′, respectively, the photoelectric cell and relay coil are thus connected across the terminals $L_1$ and $L_2$. The photoelectric cell 50′ is positioned in relatively close association with the neon tube 30′ so as to be illuminated by the tube when the tube is passing an electric current, that is, when the tube is flashing.

In FIGURE 2 of the drawing it will be observed that the main switch 27′ is closed and that the neon tube 30′ is periodically flashing, since the level of the water in the container 10′ is below the electrodes 22′ and 23′. With the neon tube 30′ flashing at intervals it will be understood that the photoelectric cell 50′ is sufficiently illuminated so that the relay coil 41′ is energized. The contactor 42′ is thus held closed against the contacts 43′ and the solenoid 18′ is also energized. When the solenoid is energized, the valve member 15′ is held open and water is accordingly supplied to the container.

When the water reaches a level whereby it contacts with the top electrode 22′, the said water provides a path for the current which is of less resistance than the path through the condenser 33' or the path through the neon tube 30'. Both elements are thereby shorted out and current ceases to flow through the tube and the tube does not flash so as to illuminate the photoelectric cell 50'. The cell has such characteristics that it presents negligible resistance to current flow when illuminated, but relatively high resistance when not illuminated. With the shorting out of the neon tube, the resistance of the cell becomes infinitely high and the relay coil 41' becomes deenergized, and the contactor 42' is released to also deenergize the solenoid 18'. Thus the valve member 15' is caused to close by spring 16' to shut off the flow of water to the container.

When the water is not in contact with the electrodes, the neon tube will periodically flash at a certain frequency and which must be high enough to adequately illuminate the light sensitive cell. Each flash of the neon tube will supply pulses of electric energy to the relay coil 41' and which is so constructed by the use of such delay devices as a condenser 53' or a dash pot that it will maintain an operative closed position unless the frequency of the light flashes falls below a predetermined minimum. When this happens the cell 50' is not sufficiently illuminated to maintain the solenoid in an energized condition and the water valve will close to shut off the flow of water. Accordingly, the frequency of the flash of the neon tube is the basic actuating device. When the tube is shorted by the water, the said relay will thus hold for a period of time equal at least to one cycle in the charging and discharging operation of the condenser before dropping out.

The electronic control circuit as described is perfectly safe for home appliances since the use of a condenser as herein contemplated makes it possible to use resistance of such high value that adequate protection is given to anyone who may come into contact with the electrodes. When the high resistances are used the electric energy is stored up in the condenser for a period of time long enough to flash the neon tube. Without the condenser and using the same high values for the resistances, it will be understood that they would be so high as to prevent any conduction at all through the neon tube.

Obviously more than one pair of electrodes could be employed placed at different levels as regards the container, and one pair or the other could be brought into circuit by switch control to control different water levels respectively, employing but a single neon tube and light sensitive cell. Also for water sensing means the auxiliary circuit may produce a signal or the like as information to the operator instead of actually controlling the actuation of a solenoid valve.

Referring to FIGURE 4 of the drawings, the container or tub 10" may comprise part of a domestic washing machine and which is alternately filled with water and then emptied as is customary with such machines during the various washing cycles. The numeral 12" indicates the water supply pipe having the down-turned discharge end 13" and which directs the water flow into the container 10". The said pipe 12" is provided with the solenoid valve 14" having the valve member 15" which is yieldingly urged by the coil spring 16" into engagement with the valve seat 17" to close the valve. The solenoid 18" is operatively connected to the valve stem 19" so that upon energization of the solenoid the valve member 15" is lifted from its seat to thus open the valve. The container 10" is emptied of its water by opening the valve 20" in the outlet pipe 21" which may be manually or automatically controlled.

The electrodes 22" and 23" project into the container 10" by extending through the plastic plug 24" in which they are mounted, and with the plastic plug being mounted in a wall of the container. The said electrodes are disposed in substantially parallel relation to each other and the same are located at the desired water level. The said electrodes are preferably formed of stainless steel, platinum or other non-corrosive conductive material in order to effectively resist corrosion. Also, the plug 24" should consist of a plastic having non-wetting characteristics. A tetrafluoroethylene plastic sold under the trade name "Teflon" has been found entirely satisfactory. When such a plastic is used the surface between the electrodes will always be dry unless the electrodes are immersed in the water.

The electric circuit for the electrodes 22" and 23" includes the conductors 25" and 26" which connect with the electrodes 22" and 23", respectively. Conductor 25" provides one terminal of the power circuit, the same having connections therewith at $L_1$. The main switch 27" for controlling the power supply may be located in this conductor. The other conductor 26" has similar connection to the other terminal of the power circuit as at $L_2$. The terminals $L_1$ and $L_2$ may have connection with the conventional home outlet which supplies 115 volt, 60 cycle alternating current. A current sensitive relay, such as reed switch 54", includes a coil 55" connected across the conductors 25" and 26", in advance of the electrodes. The resistances 31" and 32" are located in the conductors 25" and 26", respectively, in advance of the coil. The resistances 31" and 32" are relatively high in ohms in order to provide a high voltage drop and therefore a low voltage across coil 55" when only a minute current is carried across the electrodes 22" and 23" and to reduce to a safe level the electric power delivered to the coil and to the electrodes. The coil 55" of reed switch 54" is energizable at this minute current to operate switch 56".

The conductor 34" provides an auxiliary relay circuit which is associated with the conductors 25" and 26". The auxiliary circuit provides the normally open relay designated in its entirety by numeral 35". The said relay includes the coil 36" and the contactor 37" having coaction with the contacts 38" in conductor 40" for closing and opening the circuit to the solenoid 18". Said conductor 40" is electrically connected to the solenoid at 41" and to the terminal $L_2$ by connection at 42" with conductor 26". The circuit to the solenoid 18" is completed by conductor 47" having connection with the solenoid at 48" and with conductor 25" at 50".

Switch 56" of current sensitive reed switch 54" is connected by the conductor 34" in series relation with the relay coil 36". Since the conductor 34" is joined to conductors 25" and 26" at 45" and 46", respectively, the switch 56" and relay coil 36" are thus connected across the terminals $L_1$ and $L_2$. As previously indicated, switch 56" is operated by reed switch coil 55" and is operated to the open position when coil 55" is deenergized.

A half-wave rectifier may be located in line 25" ahead of resistor 31". A capacitor 58" is connected between lines 25" and 26" across electrodes 22" and 23" to maintain a steady DC voltage across coil 55".

In FIGURE 4 of the drawings, it will be observed that the main switch 27" is closed and that the coil 55" is conducting, since the level of the water in the container 10" is below the electrodes 22" and 23". With the coil 55" passing current it will be understood that the switch 56" will be closed and as a result the relay coil 36" is energized. The contactor 37" is thus held closed against the contacts 38" and the solenoid 18" is also energized. When the solenoid is energized, the valve member 15" is held open and water is accordingly supplied to the container.

When the water reaches a level connecting electrodes 23" and 22", the said water provides a path for current thereby causing an increased voltage drop across resistors 31" and 32" so that the voltage across the coil 55" drops too low to maintain a switch 56" closed. The water across the electrodes then in effect shorts out the reed switch and the coil 55" does not maintain switch 56" closed. With the opening of switch 56", the relay coil 36" becomes deenergized, and the contactor 37" is released to also deenergize the solenoid 18″. Thus, the valve member 15″ is caused to close by spring 16″ to shut off the flow of water to the container.

The pair of electrodes in the above embodiments have been shown and described as a pair of conductive probes extending into the container. This showing is not to be construed as a specific limitation for the scope of the invention would also include a construction in which one probe or conductor, mounted within the container, could serve as one electrode and the container itself, properly electrically insulated and connected into the auxiliary circuit, could serve as the other electrode. As previously indicated the current through the container with such an arrangement would be at a safe low level.

The invention is not to be limited to or by details of construction of the particular embodiments thereof illustrated by the drawings, as various other forms of the device will, of course, be apparent to those skilled in the art without departing from the spirit of the invention or the scope of the claims.

What is claimed is:

1. In a device of the character described, the combination comprising, a container adapted to contain electrically conductive materials, first circuit means operative with relatively low current flow, a pair of spaced electrodes associated with said container for contact by the materials at a predetermined level of material in said container, second circuit means operative with relatively high current flow, and an electrically energized element included in said first circuit means having a first electrical condition responsive to a predetermined voltage, said electrodes electrically connected in parallel to said electrically energized element for creating a short circuit to said electrically energized element when a circuit is completed between said electrodes, said electrically energized element responsive to the state of completion of a circuit between said electrodes for assuming a second electrical condition to effect a change in the energization of said second circuit means.

2. In a device of the character described, the combination comprising, a container adapted to contain electrically conductive materials, first circuit means operative with relatively low current flow, a pair of spaced electrodes included in said first circuit means and associated with said container for contact by the materials at a predetermined level of material in said container, second circuit means operative with relatively high current flow, means connected in parallel to said electrodes in said first circuit means and having a first electrical condition responsive to a predetermined voltage, said electrically energized element responsive to completion of a shorting circuit between said electrodes upon a rise of the material to said predetermined level for assuming a second electrical condition to effect a change in the energization of said second circuit means.

3. In a device of the character described, the combination comprising, a container adapted to contain electrically conductive materials, first circuit means operative with relatively low current flow, a pair of spaced electrodes associated with said container for contact by the materials at a predetermined level of material in said container, second circuit means operative with relatively high current flow, and a reed switch having a coil included in said first circuit means and switch means included in said second circuit, said electrodes electrically connected in parallel to said coil for creating a short circuit to said coil when a circuit is completed between said electrodes, said coil being responsive to completion of a circuit between said electrodes upon a rise of the materials to said predetermined level for operating said switch means, said switch means being operable for effecting a change in the energization of said circuit means.

4. In a device of the character described, the combination comprising: a container adapted to contain electrically conductive materials, supply means for filling said container, a capacitor and a resistor connected in series to a power source, a glow tube connected across said capacitor for causing flashing, a pair of spaced electrodes associated with said container adapted to be contacted by the material therein, said electrodes being connected across said capacitor, a light sensitive cell having one mode of operation when radiated to a predetermined extent and having another mode of operation when not radiated to said predetermined extent, said light sensitive cell positioned to be illuminated by said glow tube, and means responsive to the mode of operation of said light sensitive cell for controlling at least one electrical device associated with said device.

5. In a device of the character described, the combination comprising: a container adapted to contain electrically conductive materials, supply means for filling said container, a radiation element, a capacitor and resistor connected in series to a power source for intermittently energizing said radiation element, a pair of spaced electrodes associated with said container adapted to be contacted by the materials therein, said electrodes being connected across said capacitor for controlling the intermittent energization of said radiation element when said electrodes are shorted by materials, and means responsive to the energization of said radiation element for regulating at least one electrical device associated with said device.

6. In a device of the character described, the combination comprising: a container adapted to contain electrically conductive materials, supply means for filling said container, a glow tube, means for producing flashing of said glow tube, a pair of spaced electrodes associated with said container adapted to be contacted by the materials therein, said electrodes connected to and controlling said means for producing flashing to said glow tube, a light sensitive cell having one mode of operation when illuminated to a predetermined extent and having another mode of operation when not illuminated to said predetermined extent, said light sensitive cell position for illumination by said glow tube, and means responsive to the mode of operation of said light sensitive cell for controlling at least one electrical element associated with said device.

7. In a device of the character described, the combination comprising, a container adapted to contain electrically conductive materials, supply means for filling said container, a radiation element, means for producing intermittent energization of said radiation element, a pair of spaced electrodes associated with said container adapted to be contacted by the material therein, said electrodes connected to and controlling said means for producing intermittent energization of said radiation element, a radiation sensitive cell having one mode of operation when radiated to a predetermined extent and having another mode of operation when not radiated to said predetermined extent, said radiation sensitive cell positioned for radiation by said radiation element, and means responsive to the mode of operation of said sensitive cell for controlling at least one electrical element associated with said device.

8. In a device of the character described, the combination comprising, a container adapted to contain electrically conductive materials, a glow tube, supply means for filling said container, means for producing intermittent flashing of said glow tube, a pair of spaced electrodes associated with said container adapted to be contacted by the materials therein, said electrodes connected to said latter means for controlling the flashing of said glow tube, and means responsive to the flashing of said glow tube for regulating at least one electrical element associated with said device.

9. In a device of the character described, the combination comprising, a container adapted to contain electrically conductive materials, a supply means for filling said container, a radiation element, means for producing intermittent energization of said radiation element, a pair of spaced electrodes associated with said container adapted to be contacted by the materials therein, said electrodes connected to and controlling said means for producing the intermittent energization of said radiation element, and means responsive to the energization of said radiation element for controlling at least one electrical element associated with said device.

10. In a device of the character described, the combination comprising, a container, means for supplying said container with electrically conductive materials, a frequency generator for producing electrical frequencies including a radiation generating element for causing intermittent radiation, a pair of spaced electrodes associated with said container adapted to be contacted by materials therein, said electrodes connected to said frequency generator so as to control the electrical frequency produced thereby, a radiation sensitive cell having one mode of operation when radiated to a predetermined extent and having another mode of operation when not radiated to said predetermined extent, said radiation sensitive cell positioned for radiation by said radiation generating element, and means responsive to the mode of operation of said radiation sensitive cell for controlling at least one electrically operated element associated with said device.

11. In a control system responsive to liquid conditions, the combination comprising, a container adapted to contain electrically conductive materials, solenoid operated means, a light sensitive cell controlling said solenoid operated means, a prime power circuit for supplying electrical energy to said solenoid operated control means, a pair of electrodes associated with said container at least one of which is positioned at a preselected material level, an auxiliary power circuit for supplying electrical energy to said electrodes at values lower than in said prime power circuit to protect an operator against injury, and a gaseous discharge tube connected across the electrodes for emitting a glow except when shorted out by material in said container contacting both of said electrodes, said gaseous discharge tube positioned to illumine said light sensitive cell to energize said solenoid operated means when the gaseous discharge tube is conducting and to de-energize said solenoid operated means when said gaseous discharge tube is shorted out by material contacting both of said electrodes.

12. In a control system responsive to liquid conditions, the combination comprising, a container adapted to contain electrically conductive materials, electrically operated control means for controlling an operation, a prime power circuit for supplying electrical energy to said electrically operated control means, a light sensitive cell in series with and controlling the operation of said electrically operated control means so that said electrical control means is operated only when said light sensitive cell is illuminated, a pair of electrodes associated with said container at least one of which is at a preselected location so that the material in said container produces a short therebetween upon predetermined conditions, an auxiliary power circuit for supplying electrical energy to said electrodes at values lower than in said prime power circuit to protect against injury, and a gaseous discharge device connected across the electrodes for emitting a glow except when shorted out by material in said container shorting said electrodes, said gaseous discharge device positioned to illumine said light sensitive cell to energize said electrically operated control means when the gaseous discharge device is conducting and to de-energize said electrically operated control means when said gaseous discharge device is de-energized by material shorting said electrodes.

13. In a device for the level control of electrically conductive materials, the combination with a container and a valve for discharging a material into the container comprising, a pair of spaced and insulated electrodes in the container and at least one of said electrodes projecting within the container at the predetermined material level, a source of electric current the terminals of which connect respectively with the said electrodes, a glow tube connected across said current source in advance of the electrodes, whereby said tube is normally conductive to produce a glow except when shorted out as a result of the material contacting the electrodes, a light sensitive cell electrically connected across said current source and disposed relatively adjacent the glow tube, said cell having low resistance when illuminated by said glow tube but having relatively high resistance when not illuminated, a relay in series relation with the light sensitive cell, and connections between the relay and the solenoids of said valve, whereby said relay is energized to in turn energize the solenoid to cause material to be discharged into the container when the cell is illuminated by the glow tube, and whereby the relay is de-energized to stop material flow when the glow tube is shorted out as a result of the material contacting the electrodes.

14. A device of the character described, the combination with a container, of an auxiliary electric circuit responsive to the presence of electrically conductive material within the container, an electric power circuit for energizing the auxiliary circuit, a light sensitive cell having operation when illuminated to connect the auxiliary circuit to said electric power circuit whereby to energize the same, and said cell when not illuminated effecting disconnection of the auxiliary electric circuit from the electric power circuit, a pair of electrodes located within the container and insulated from each other by a non-wetting insulating mounting, conductors connecting the electrodes with the terminals of the electric power circuit respectively, a relatively high resistance in at least one of said conductors and a glow tube connected across the electrodes and disposed relatively adjacent the light sensitive cell, whereby said glow tube is conductive to maintain the light sensitive cell illuminated except when it is shorted out by the material within the container when the same is in contact with the electrodes.

15. In a device for level control of electrically conductive materials, the combination with a container and a solenoid valve for discharging such materials into the container when the solenoid of the valve is energized, a pair of spaced and insulated electrodes supported by a wall of the container and projecting within the container at a predetermined liquid level, a source of electric current the terminals of which connect respectively with the said electrodes, a glow tube connected across said current source in advance of the electrodes, whereby said tube is normally conductive to produce a glow except when shorted out as a result of the material contacting the electrodes, a light sensitive cell electrically connected across said current source and disposed relatively adjacent the glow tube, said cell having low resistance when illuminated by said glow tube but having relatively high resistance when not illuminated, a relay in series relation with the light sensitive cell, and connections between the relay and the solenoid of said valve, whereby said relay is energized to in turn energize the solenoid to cause materials to be discharged into the container when the cell is illuminated by the glow tube, and whereby the relay is de-energized to stop material flow when the glow tube is shorted out as a result of the material contacting the electrodes.

References Cited

UNITED STATES PATENTS

| 2,159,531 | 5/1939 | Polin | 317—123.4 |
| 2,588,677 | 3/1952 | Welty et al. | 137—391 X |
| 2,838,719 | 6/1958 | Chitty | 317—124 |
| 3,025,504 | 3/1962 | Ohse | 317—123.4 |
| 3,040,178 | 6/1962 | Lyman et al. | 317—124 |
| 3,159,573 | 12/1964 | Ritchie | 317—123.4 |

WILLIAM F. O'DEA, *Primary Examiner.*

D. MATTHEWS, *Assistant Examiner.*